United States Patent
Klein et al.

(10) Patent No.: US 9,478,963 B1
(45) Date of Patent: Oct. 25, 2016

(54) CORD REEL

(71) Applicants: John Klein, Gilbert, AZ (US); Jeffrey Baldwin, Dessert Hills, AZ (US)

(72) Inventors: John Klein, Gilbert, AZ (US); Jeffrey Baldwin, Dessert Hills, AZ (US)

(*) Notice: Subject to any disclaimer, the term of this patent is extended or adjusted under 35 U.S.C. 154(b) by 158 days.

(21) Appl. No.: 14/190,065

(22) Filed: Feb. 25, 2014

Related U.S. Application Data

(60) Provisional application No. 61/775,447, filed on Mar. 8, 2013.

(51) Int. Cl.
  *B65H 75/14* (2006.01)
  *H02G 11/02* (2006.01)

(52) U.S. Cl.
  CPC .................................... *H02G 11/02* (2013.01)

(58) Field of Classification Search
  CPC ..................... B65H 75/241; B65H 2402/5163
  USPC ............ 242/607, 607.1, 608.5–608.6, 609.1, 242/609.3, 614
  See application file for complete search history.

(56) References Cited

U.S. PATENT DOCUMENTS

| | | | | |
|---|---|---|---|---|
| 4,867,391 A * | 9/1989 | Resch | ................. | B65H 75/241 242/118.5 |
| 6,241,181 B1 * | 6/2001 | Campbell | ............. | B65H 75/22 242/578 |
| 6,676,069 B1 * | 1/2004 | Davis | ................... | B65H 75/146 242/405.2 |
| 6,736,349 B1 * | 5/2004 | Boisdon | ................ | B65H 75/22 242/118.61 |
| 7,588,210 B2 * | 9/2009 | Hafner | ................... | B65H 75/22 242/118.4 |
| 8,845,850 B2 * | 9/2014 | Kostick | ..................... | C09J 4/00 156/330.9 |
| 2005/0139723 A1 * | 6/2005 | Couchey | ............... | B65H 75/14 242/609.1 |
| 2007/0257146 A1 * | 11/2007 | Fleming | ................ | B65H 75/14 242/405.3 |
| 2008/0135676 A1 * | 6/2008 | Hafner | .................. | B65H 75/22 242/608.5 |

* cited by examiner

*Primary Examiner* — Sang Kim
(74) *Attorney, Agent, or Firm* — Ryan Liebengood

(57) ABSTRACT

A cord reel including a body having two side walls on opposing sides for receiving a cord therebetween, at least one hole within the body extending inward from each of the side walls, and wherein the body is adjustable to increase or decrease a distance between the two end walls.

15 Claims, 15 Drawing Sheets

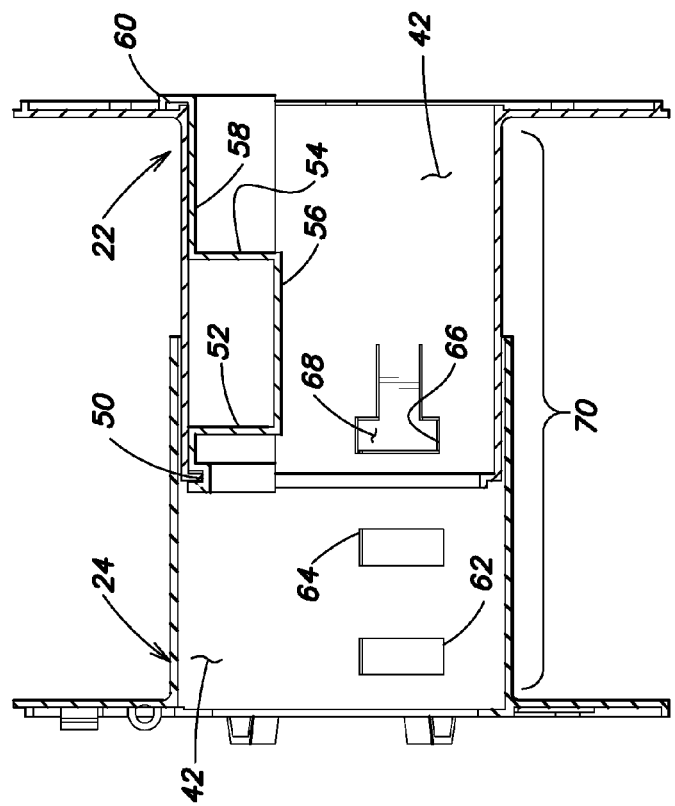
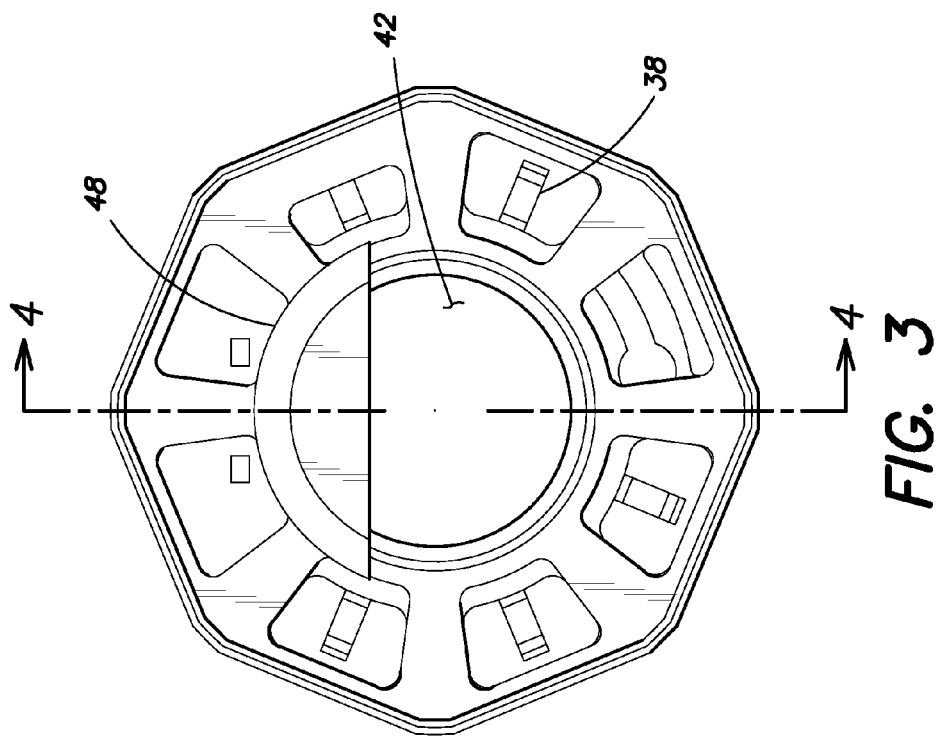
FIG. 4
FIG. 3

CORD REEL

CROSS REFERENCE TO RELATED APPLICATIONS

This application claims priority to U.S. Provisional Patent Application No. 61/775,447, entitled CORD REEL and filed on Mar. 8, 2013, the disclosure of which is hereby incorporated herein by reference.

BACKGROUND

1. Technical Field

Aspects of the present disclosure relate generally to electrical cord holding devices and apparatus for efficiently and effectively preventing cords from tangling during usage and/or winding.

2. Background Art

Electrical cords are well known and are used to provide electrical current to a number of devices. A number of electrical cord storage devices are known for transit or non-transit storage. Transit cord holding devices may be as simple as a flat, rectangular plastic device with alignment portions for ensuring the cord properly wraps around the holder. Permanently mounted devices may include a rotatable component for more easily winding up the electrical cord on the cord reel.

SUMMARY

Aspects of this disclosure relate to a cord reel including a body having two side walls on opposing sides for receiving a cord therebetween, at least one hole within the body extending inward from each of the side walls, and wherein the body is adjustable to increase or decrease a distance between the two sidewalls.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and:

FIG. 3 is a side view of the cord reel.

FIG. 4 is a sectional view taken generally about line A-A in FIG. 3.

DETAILED DESCRIPTION

Figure 1:
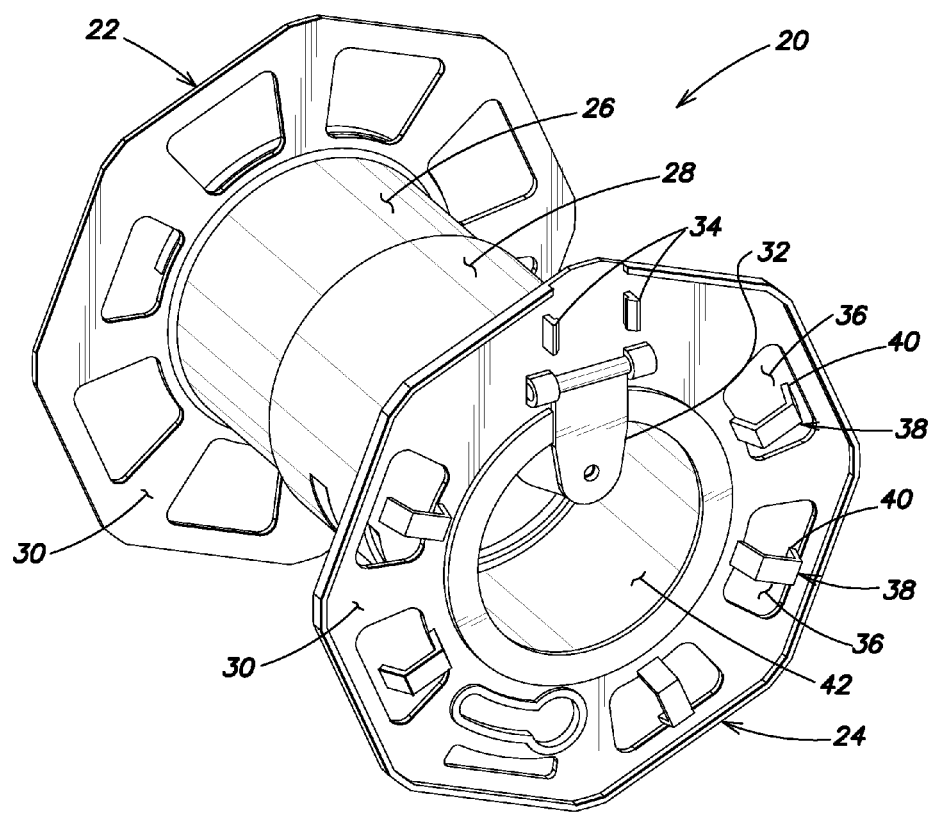
FIG. 1 is a perspective view of a cord reel removed from a base and without a cord thereon.
Figure 2:
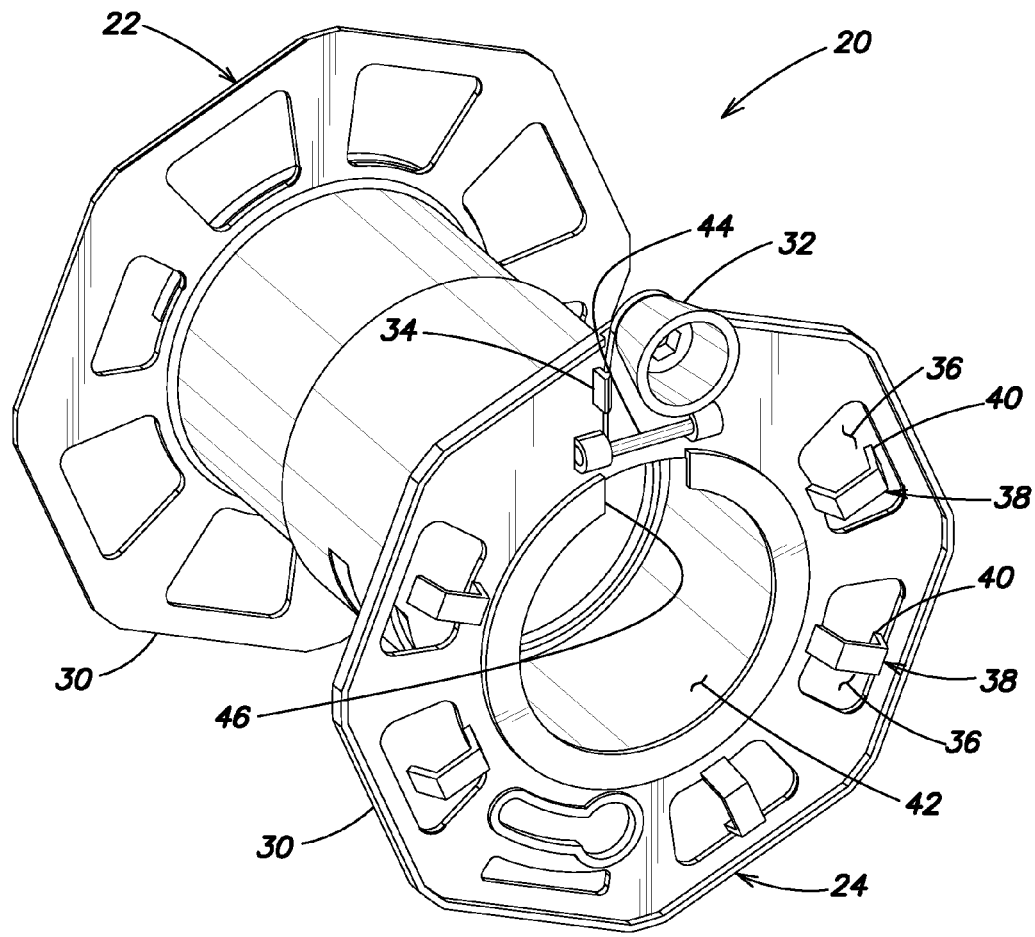
FIG. 2 is a perspective view of the cord reel with the knob rotated outward.
Figure 5A:
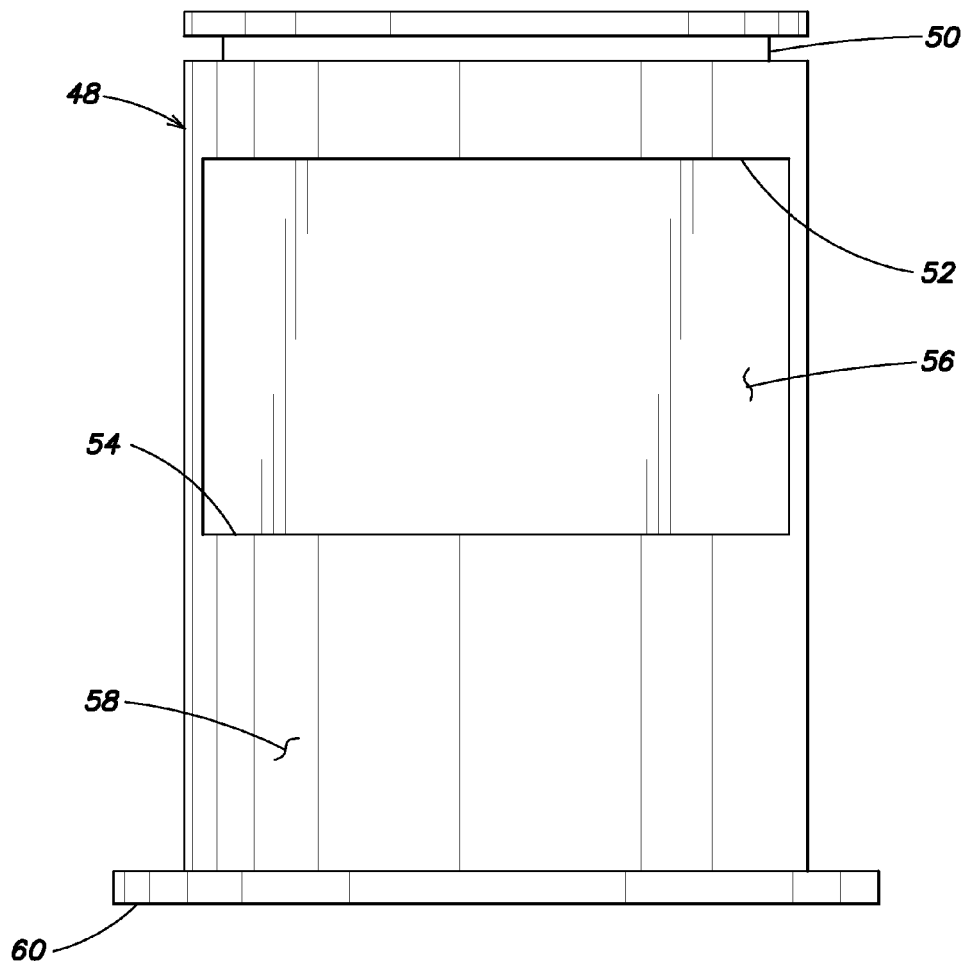
FIGS. 5A-5D are various views of an arm mount.
Figure 5B:
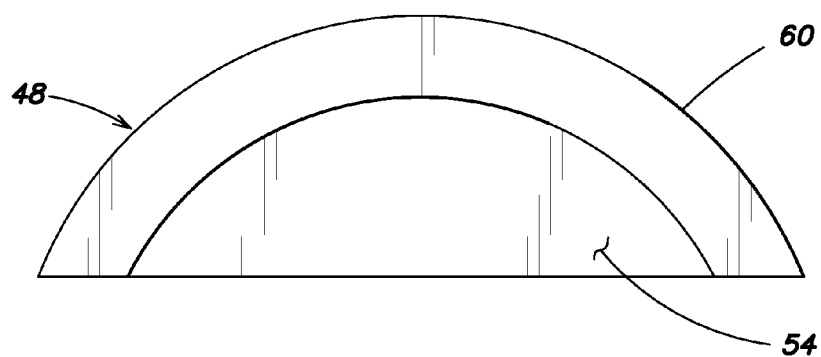
Figure 5C:
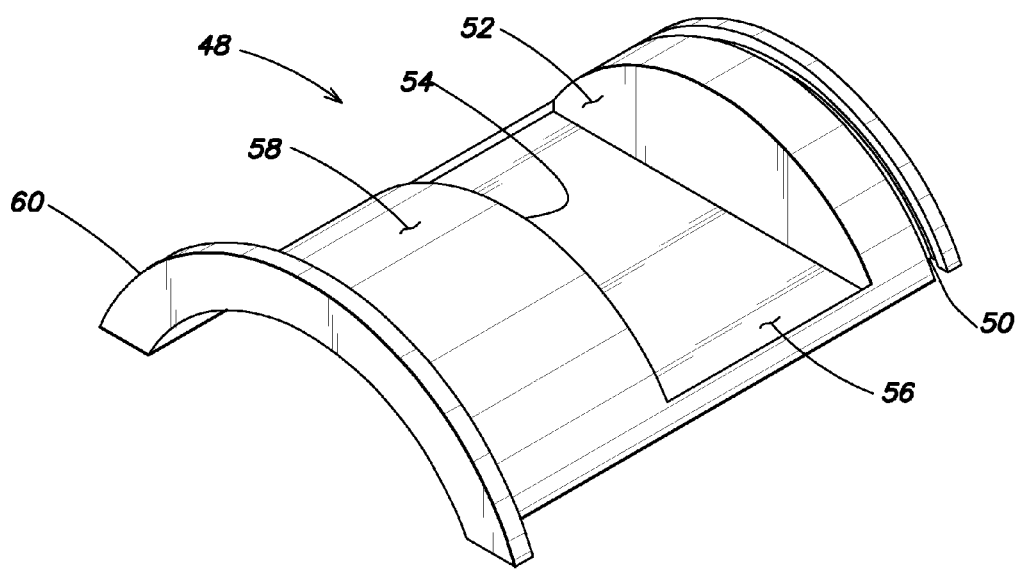
Figure 5D:
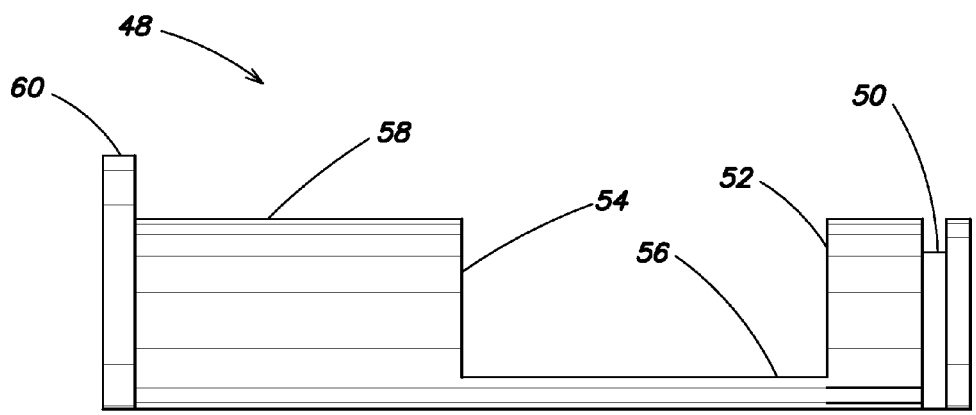

This disclosure, its aspects and implementations, are not limited to the specific components or assembly procedures disclosed herein. Many additional components and assembly procedures known in the art consistent with the intended operation and assembly procedures for a cord reel will become apparent for use with implementations of a cord reel from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of a cord reel.

FIGS. 1 through 4 illustrate various views of reel 20. Reel 20 may include a first portion 22 and a second portion 24, with cord regions 26 and 28 on the first portion and second portion, respectively. Cord regions 26 and 28 are generally defined by an outer surface of the first and second portions with a pair of end walls 30 defining a perimeter of the cord regions. At least one end wall may include a knob 32 which is pivotably rotatable about knob pivot 44 so that the knob can be retained within clips 34, thereby allowing the cord reel 20 to be rotated. The same end wall 30 may include a plurality of apertures 36 with retainers 38 extending at least partially over the apertures. The retainers may also include a hook 40 for better retaining an electrical cover between end wall 30, apertures 36, retainers 38, and hooks 40. Both end walls 30 may include holes 42 which may extend only partially within the respective first and second portions or all the way through both the first and second portions. Further, hole 42 may include a knob recess 46 arranged to receive knob 32 which pivoted about knob pivot 44 to both secure an electrical cable partially between knob 32 and end wall 30 as well as connect the cord reel to a base knob as will be described in greater detail below.

FIGS. 3 through 5D specifically highlight arm mount 48 positionable within hole 42 for allowing the operator to support the cord reel 20 while still allowing rotation of the cord reel for purposes of wrapping a cord around the cord regions 26 and 28. Further, arm mount 48 may include a recess 50 complimentary shaped to receive one of the first or second portions 22 and 24 and a back edge 52, a front edge 54, a grip 56, and a rest 58. In operation, back edge 52 is contacted with by a user's fingers while front edge 54 and grip 56 may be contacted by a user's fingers or palm. Rest 58 may function as an area for a user's palm or wrist to help support the cord reel weight. The arm mount 48 may also include a lip 60 protruding beyond an edge of the end wall 30 to further connect the arm mount 48 to the cord reel. Advantageously, the arm mount 48 allows relative rotational movement between the arm mount 48 and the cord reel 20.

Second portion 24 may include a plurality of slots, specifically a first slot 62, a second slot 64, and a third slot 66 spaced from the end wall inwards. The first portion 22 may include at least one locking tab 68 arranged for selective engagement with the plurality of slots. Advantageously, there may be multiple slots positioned around the second portion 24 at each of the slot positions and there may be multiple locking tabs 68 as well. In one particular implementation, there are two slots 62, two slots 64, two slots 66, and two locking tabs 68, with each of the slots and tabs positioned 180 degrees for the corresponding slot or tab. This arrangement ensures there is not relative movement between the first and second portions if not desired. As can be seen, by locating the locking tab 68 in various slots, the width between end walls 30 can be varied to support shorter or longer electrical cables and the surface area of cord surface 70 may be changed.

Figure 6:
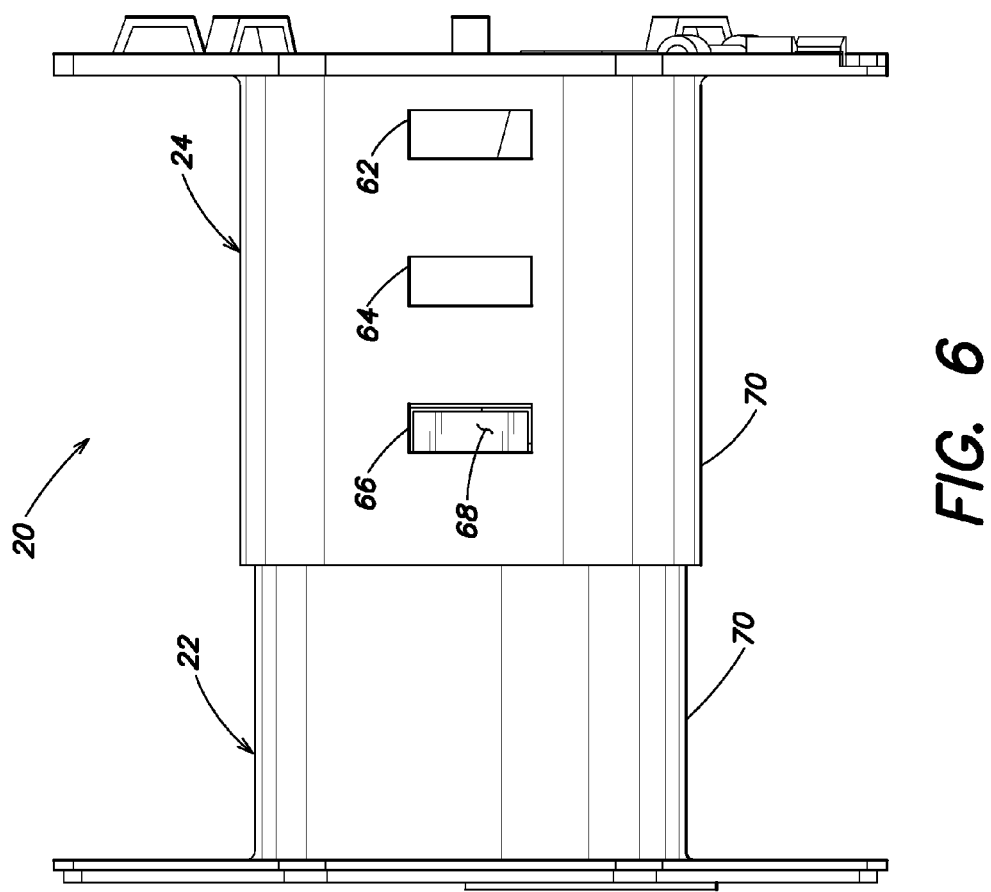
FIG. 6 is a front view of the cord reel in the widest position.
Figure 7:
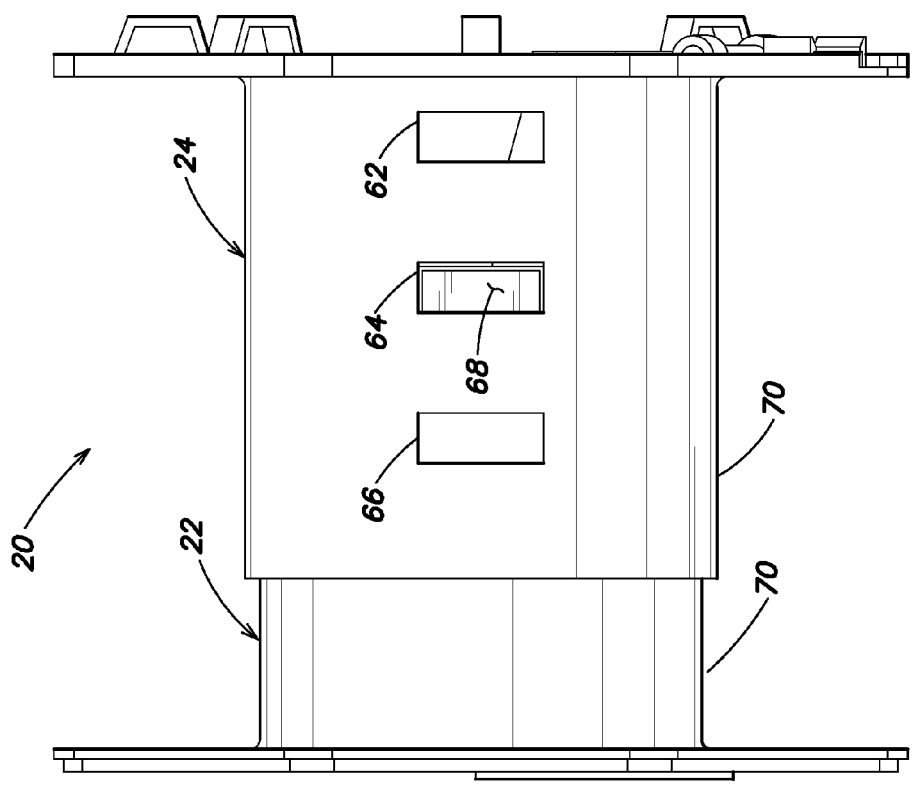
FIG. 7 is a front view of the cord reel in the middle position.
Figure 8:
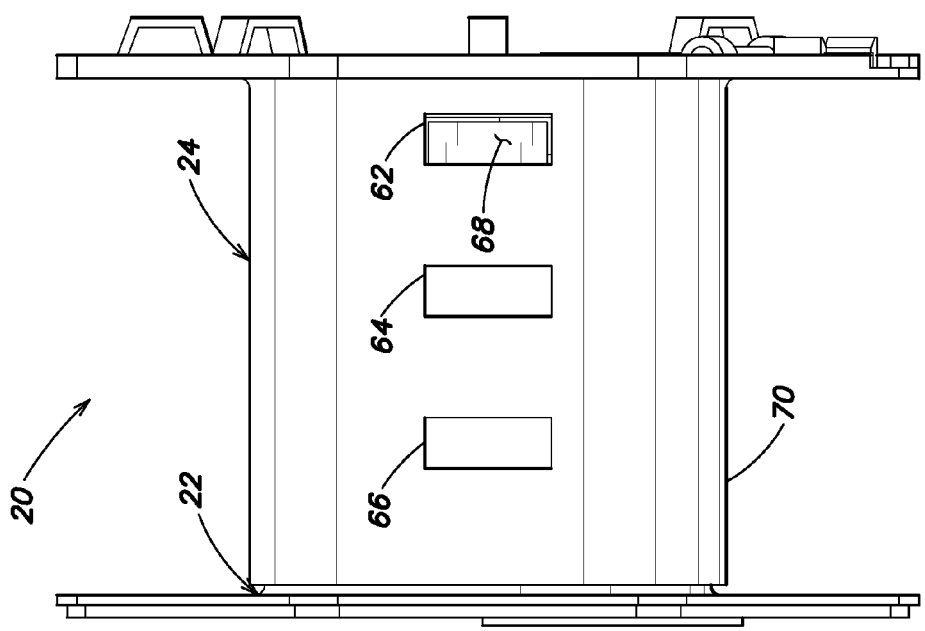
FIG. 8 is a front view of the cord reel in the smallest position

FIG. 6 illustrates the cord reel 20 in the widest position with locking tab 68 positioned within slot 66, while FIG. 7 illustrates cord reel 20 in an intermediate position with locking tab 68 positioned within slot 64, and FIG. 8 illustrates cord reel 20 in the narrowest position with locking tab 68 positioned within slot 62. While only three slots and positions are shown, it is within the spirit and scope of the disclosure to incorporate any number of slots and locking tabs or a suitable infinitely adjustable mechanism between the cord reel portions to fine tune the overall width of the cord reel.

Figure 9:
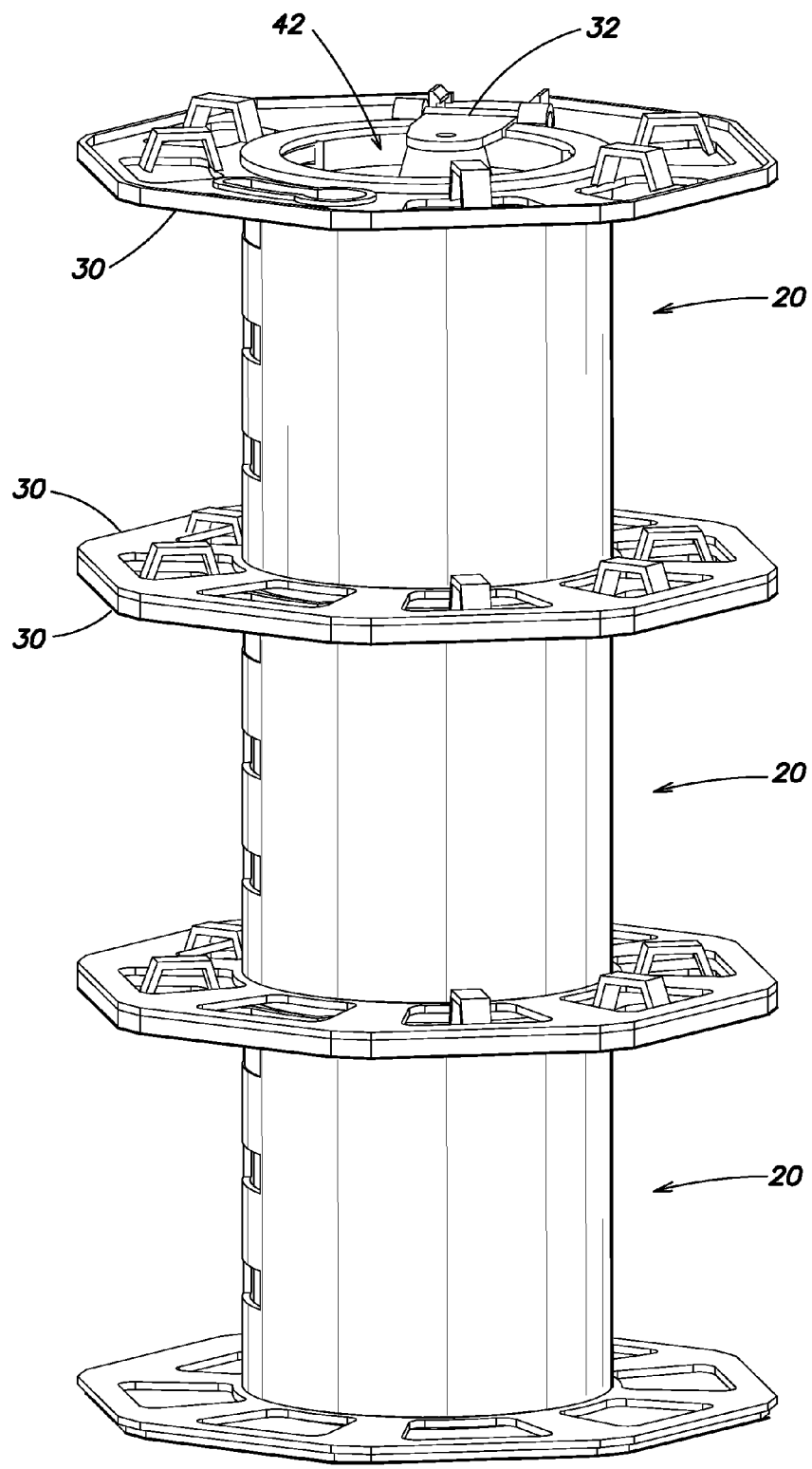
FIG. 9 is a plurality of cord reels stacked on top of each other.

FIG. 9 illustrates a plurality of cord reels 20 stacked on top of one another so that a longer cord can be secured therein or to better organize a workspace. Specifically, the end walls of the cord reels may each include different sizes. For example, the first portion may have an end wall of a first size, while the opposing second portion have an end wall of a second size slightly smaller or slightly larger than the first size. Advantageously, this allows two or more adjacent cord reels to be frictionally stacked together. Alternatively, the end walls may include snap together or locking features not specifically shown, but envisioned within the spirit and scope of the present disclosure.

Figure 10:
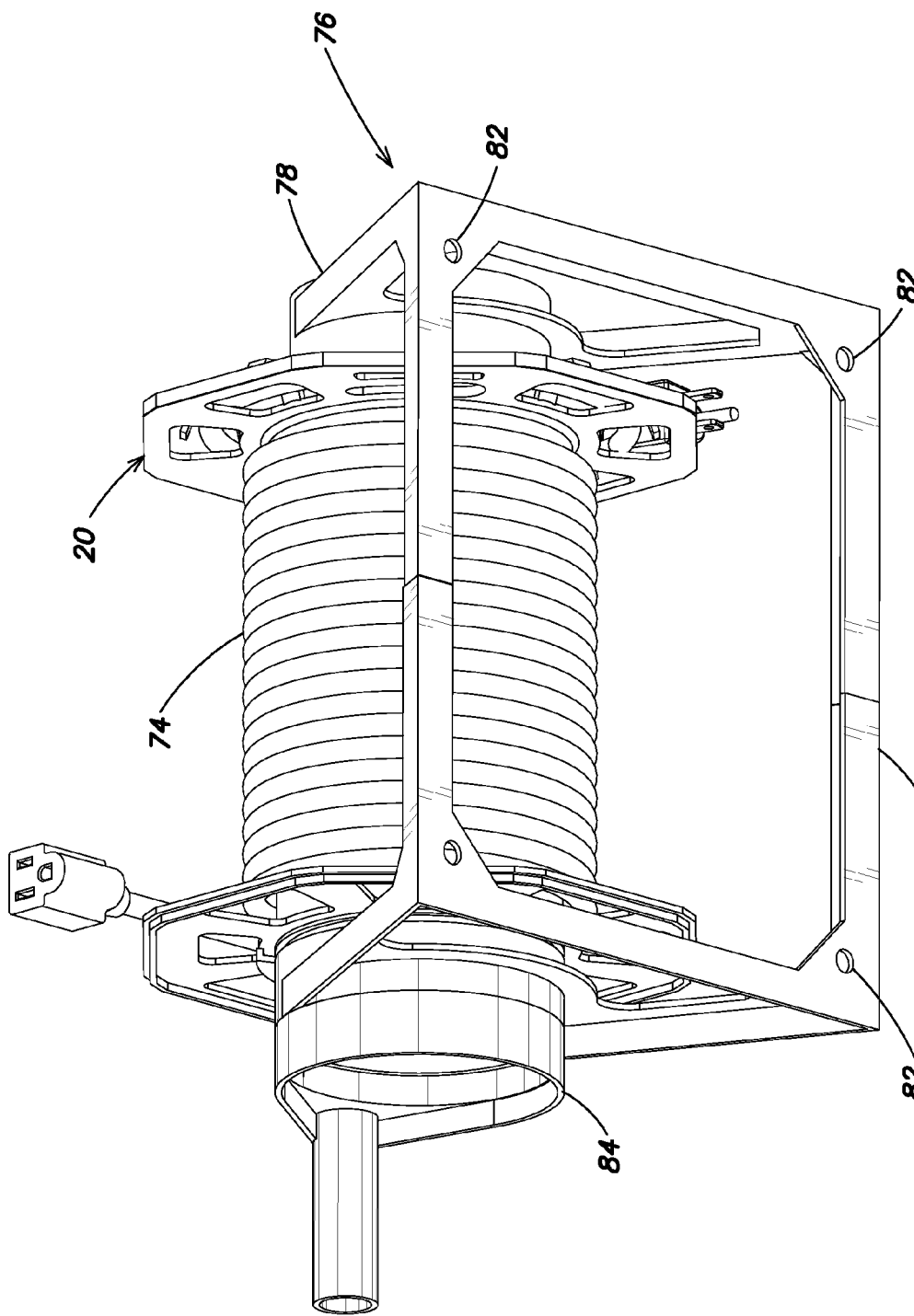
FIG. 10 is a bottom perspective view of the cord reel mounted on a reel base with an electrical cord positioned on the reel.

FIG. 10 illustrates cord reel 20 with cord 74 on cord base 76. Cord base 76 may include base legs 78 and a base mount 80 having base apertures 82 therein for securing the base to a vehicle or floor, for example. Further, a base knob 84 may be utilized to further connect the cord reel 20 to reel base 80 as will be discussed in greater detail below.

Figure 11:
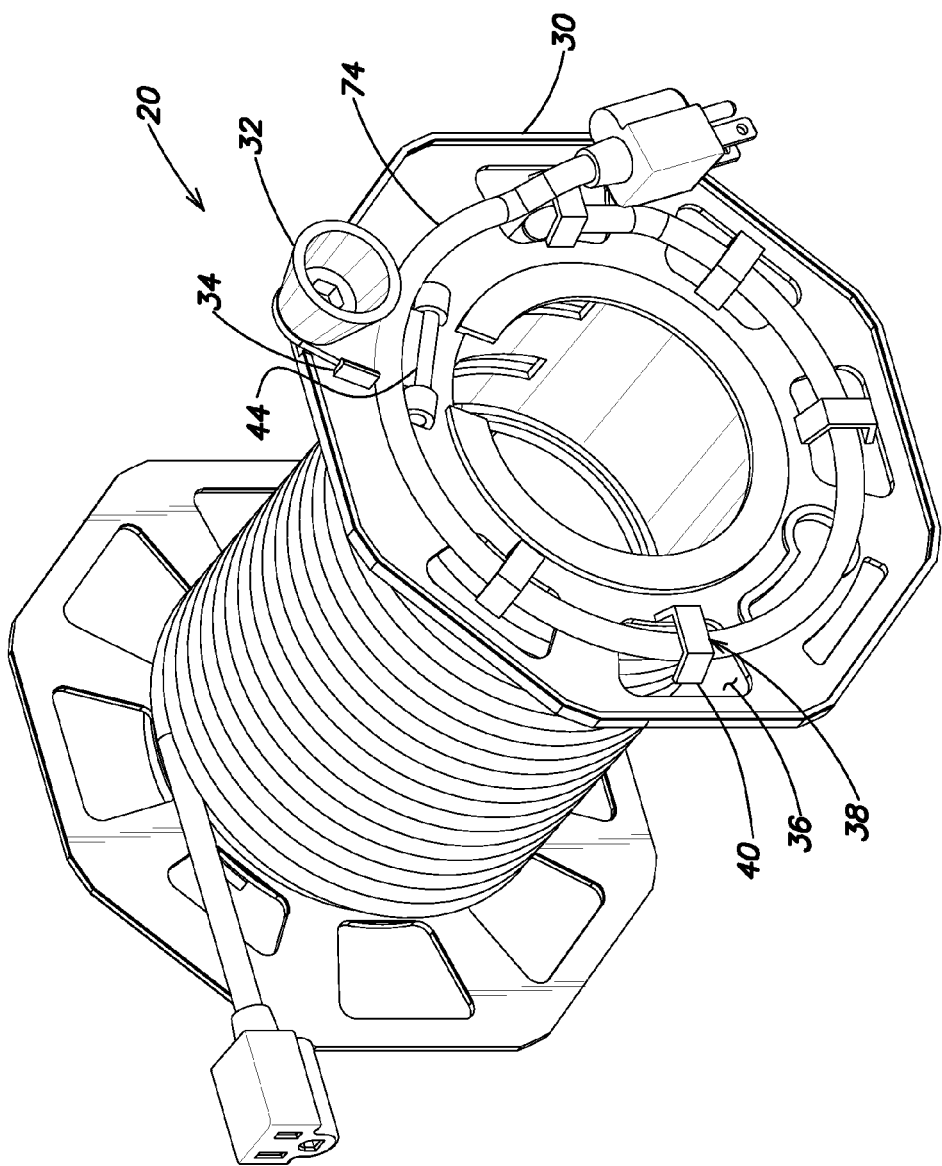
FIG. 11 is a perspective view of the cord reel with an electrical cord thereon and one end of the electrical cord positioned in a never flap feature.
Figure 12:
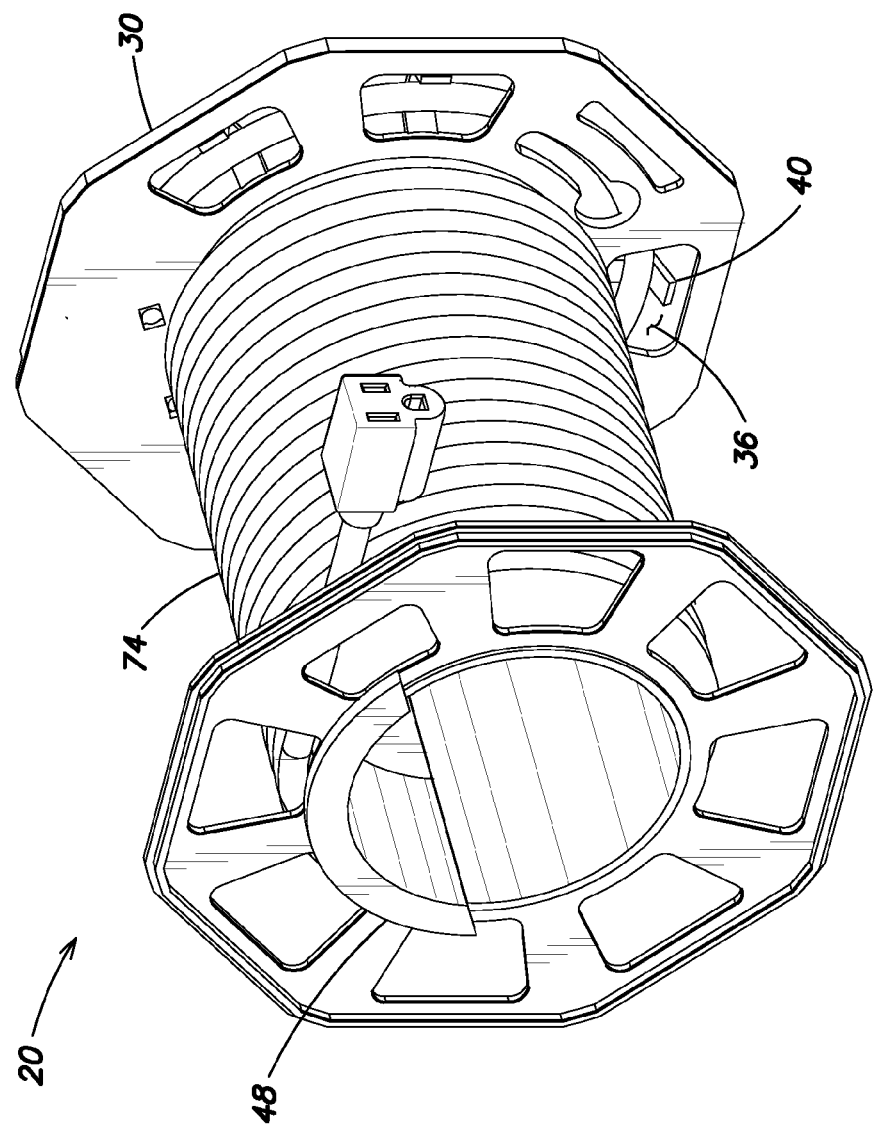
FIG. 12 is a perspective view of the cord reel with an electrical cord thereon.

FIGS. 11 and 12 illustrate the cord reel 20 with cord 74 thereon and utilizing the "never-flap" feature, whereby the electrical cord 74 is passed through at least one aperture 36 from the cord surface 70 to outside the end wall 30. The cord is then routed between end wall 30 and retainers 38, apertures 36, and held in place with the assistance of hooks 40. Advantageously, this arrangement allows the user to store several feet of the extension cord outside of the cord surface 70 to prevent the first wrapped end from rotating wildly and contacting the user or objects around the reel during the wind-up process. Further, the "never-flap" feature allows the user to have an immediate and readily available portion of the electrical cable for connecting the electrical cable to an outlet without having to unwind the entire cord reel.

Figure 13:
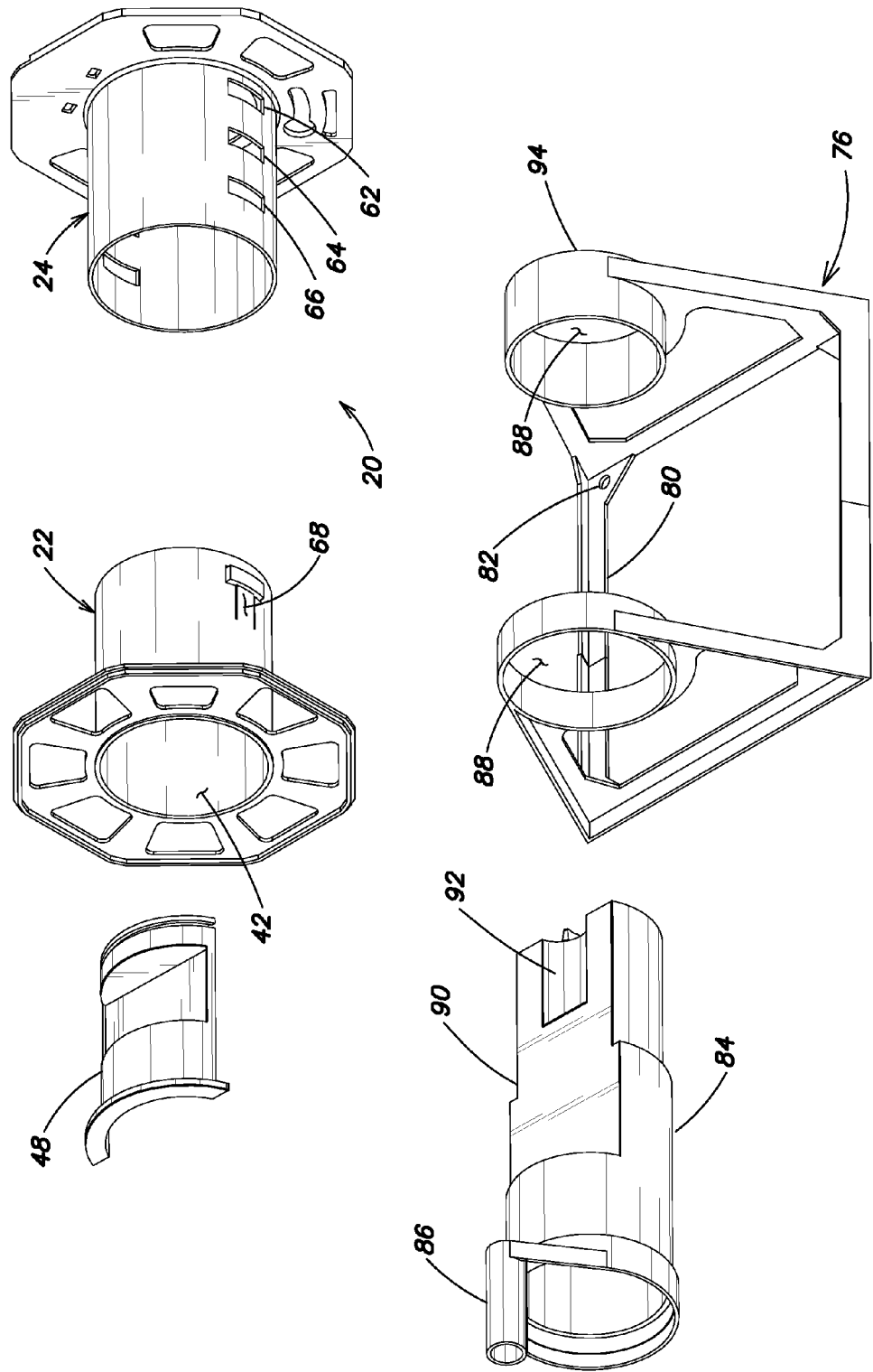
FIG. 13 is an exploded view of the cord reel and the reel base.
Figure 14:
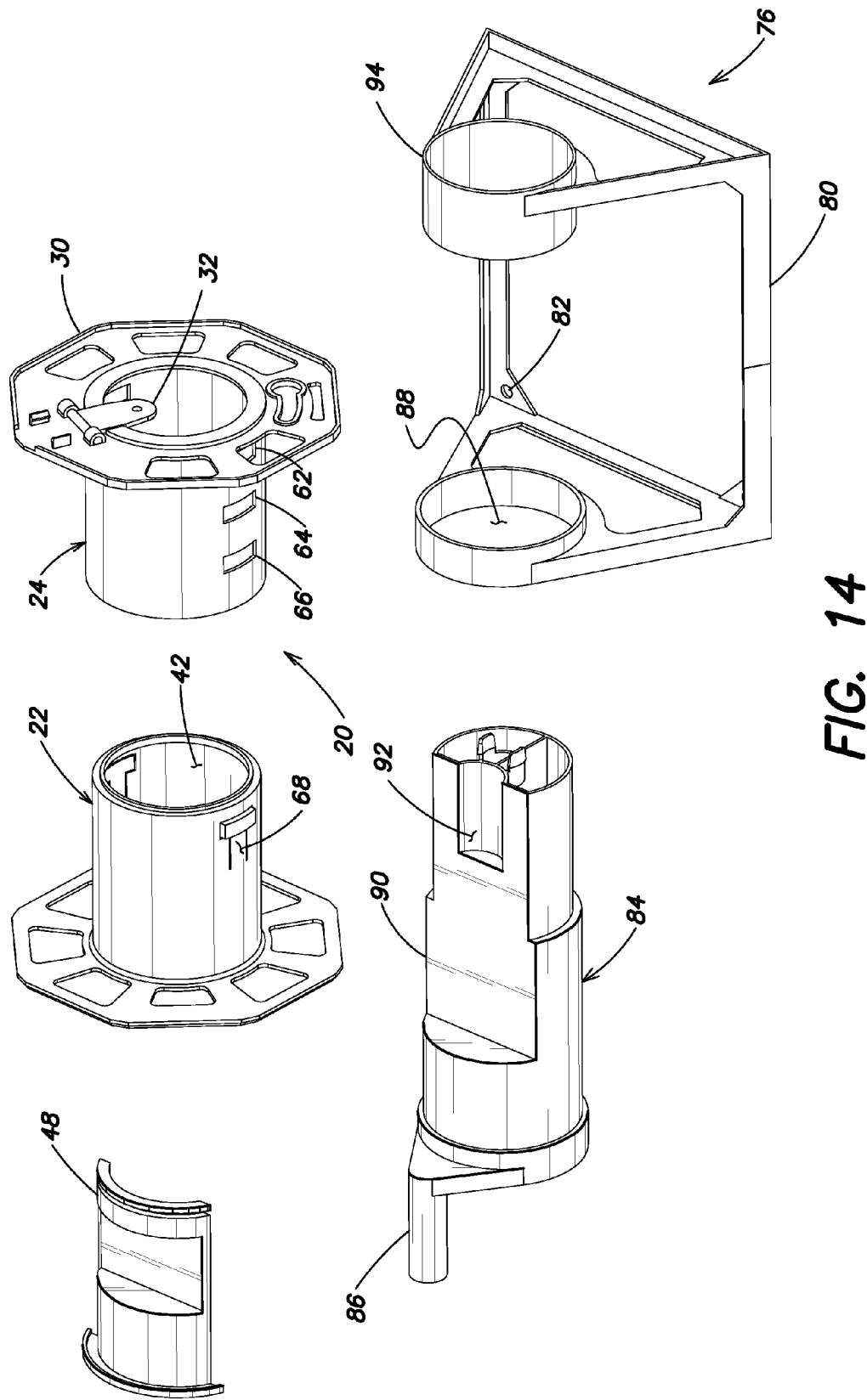
FIG. 14 is an exploded view of the cord reel and the reel base.
Figure 15:
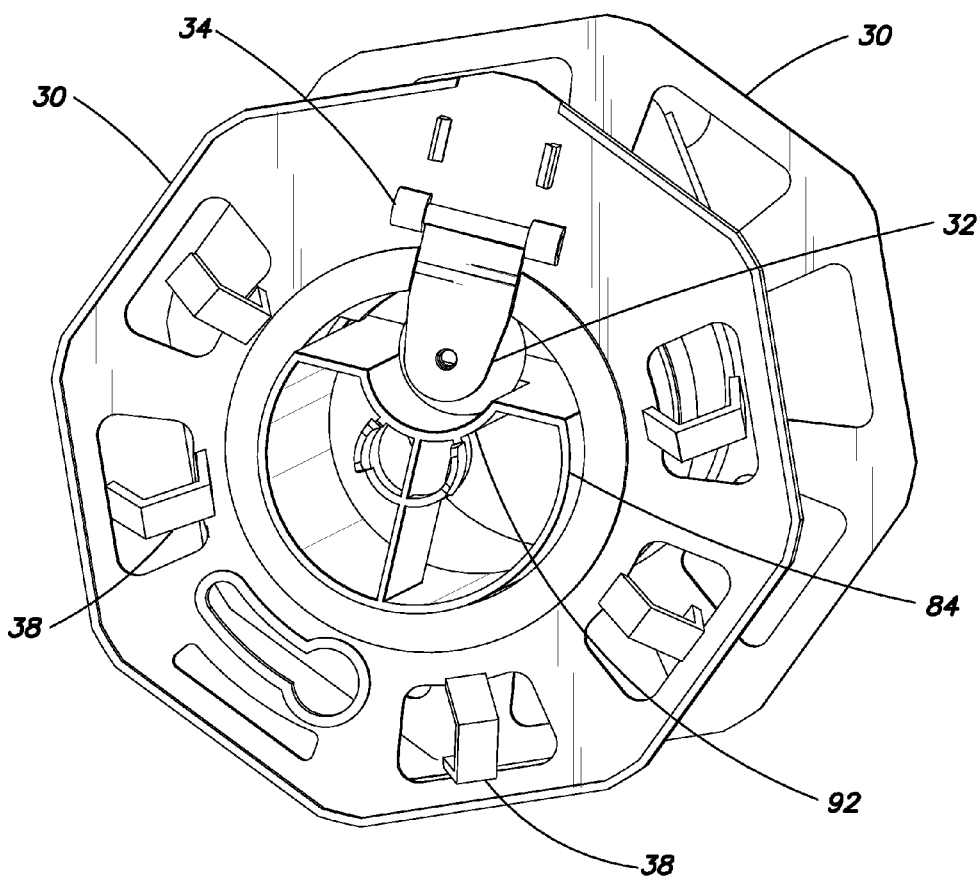
FIG. 15 is a perspective side view of the cord reel with a base knob positioned within the cord reel.

FIGS. 13-15 illustrate various exploded and assembled views of the cord reel 20 on reel base 76. Further, base knob 84 is shown in greater detail with a crank 86 for rotating the cord reel on the reel base and a base knob body 90 extending from one end of the base to the other end and terminating with a base knob indent 92 partially secured within base mounting cylinder 94 which also may include a through hole opening. Base 76 also includes a base mounting aperture 88 such that cord reel 20 is mounted to the base between base mounting aperture 88 and base mounting cylinder 94.

In operation, base knob 84 is inserted through the first portion 22 and second portion 24 until it extends roughly even with end wall 30 or remains within hole 42. Advantageously, this arrangement allows knob 32 to be pivotable downwards into base knob indent 92. Accordingly, when base knob crank 86 rotates base knob 84, the contact between indent 92 and knob 36 forces cord reel 20 to rotate on base 76 during a winding step. Further, the base knob 84 is insertable within hole 42 without pivoting knob 32 for easier operation.

Additional features of the cord reel include end walls 30 which may be generally circular in shape with flat spots for preventing the cord reel from rolling away from the user. Further, the cord reel may be formed of any suitable material, such as plastic for example and may be manufactured of several smaller parts with the purchaser assembling the final cord reel to reduce shipping sizes.

Throughout the disclosure, end walls 30 are described using the same reference. It should be appreciated that each end walls 30 may be modified to include or exclude the various components, including apertures 36, retainers 38, and hooks 40. Accordingly, these components allow the cord reel to easily retain electrical cords against the end walls 30 as well as allow the various cord reels to be easily connected.

It will be understood that implementations are not limited to the specific components disclosed herein, as virtually any components consistent with the intended operation of a method and/or system implementation for a cord reel may be utilized. Components may comprise any shape, size, style, type, model, version, class, grade, measurement, concentration, material, weight, quantity, and/or the like consistent with the intended operation of a method and/or system implementation for a cord reel.

The concepts disclosed herein are not limited to the specific implementations shown herein. For example, it is specifically contemplated that the components included in a particular implementation of a cord reel may be formed of any of many different types of materials or combinations that can readily be formed into shaped objects and that are consistent with the intended operation of a cord reel. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the cord reel may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a cord reel, it should be readily apparent that a number of modifications may be made without departing from the spirit thereof and that these implementations may be applied to other cord reels. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. A cord reel comprising:
   a body having two end walls on opposing sides for receiving a cord therebetween;
   at least one hole within the body extending inward from a central portion of each of the end walls;
   wherein the body is adjustable to increase or decrease a distance between the two end walls;
   an arm mount within the at least one hole for rotating the cord reel about the arm mount; and
   a knob separate from the arm mount and pivotable into the at least one hole when not in use.

2. The cord reel of claim 1 wherein the body further comprises a first portion and a second portion slidably engaged with one another.

3. The cord reel of claim 2 wherein one of the first portion or the second portion further comprises a plurality of slots and the other of the first portion or the second portion further comprises at least one locking tab.

4. The cord reel of claim 3 wherein the plurality of slots and the at least one locking tab are engaged to selectively determine the width of the cord reel.

5. The cord reel of claim 1 wherein at least one of the end walls further comprises a plurality of apertures and retainers.

6. The cord reel of claim 5 wherein the plurality of apertures and retainers selectively retain at least a portion of an electrical cord between an outer side of the at least one end wall and the retainers and wherein the retainer extends outward from the at least on end wall.

7. The cord reel of claim 6 wherein the electrical cord extends through at least one of the apertures.

8. The cord reel of claim 5 wherein the at least a portion of the electrical cord is retained between the outer side of the at least one end wall and the retainers while the remainder of the electrical cord is wrapped around the cord reel.

9. The cord reel of claim 1 wherein a plurality of cord reels are stackable on one another.

10. The cord reel of claim 1 further comprising a base for removably securing the cord reel.

11. The cord reel of claim 10 wherein the base further comprises at least two mounting portions having openings for removably mounting the cord reel.

12. The cord reel of claim 11 wherein the cord reel is rotatable about the base.

13. The cord reel of claim 11 further comprising a base knob removably secured within the at least one hole and the knob is engageable with the base knob for rotating the cord reel.

14. The cord reel of claim 1 wherein the two end walls are generally circular in shape with a plurality of flat sections along the periphery.

15. The cord reel of claim 1 wherein the arm mount is positioned adjacent one of the two end walls and the knob is attached on the other of the two end walls thereby orienting the arm mount and the knob on opposite sides of the cord reel.

* * * * *